US012579529B2

(12) United States Patent
Johnson et al.

(10) Patent No.: US 12,579,529 B2
(45) Date of Patent: Mar. 17, 2026

(54) MEASUREMENT INFORMATION PROCESSING MODE SWITCHING SYSTEM

(71) Applicant: Toshiba Global Commerce Solutions, Inc., Durham, NC (US)

(72) Inventors: Brad M. Johnson, Raleigh, NC (US); David J. Steiner, Durham, NC (US); Suzanne M. Bleakley, Cary, NC (US); William L. Dungan, Cary, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 211 days.

(21) Appl. No.: 18/372,185

(22) Filed: Sep. 25, 2023

(65) Prior Publication Data

US 2024/0020669 A1     Jan. 18, 2024

Related U.S. Application Data

(63) Continuation of application No. 17/543,271, filed on Dec. 6, 2021, now Pat. No. 12,020,227.

(51) Int. Cl.
    *G06Q 20/20*       (2012.01)
    *G06Q 20/18*       (2012.01)
           (Continued)

(52) U.S. Cl.
    CPC ........... *G06Q 20/201* (2013.01); *G06Q 20/18* (2013.01); *G06Q 20/208* (2013.01); *G06T 7/20* (2013.01);
           (Continued)

(58) Field of Classification Search
    CPC .... G06Q 20/201; G06Q 20/18; G06Q 20/208; G06T 7/20; G06T 2207/10016;
           (Continued)

(56) References Cited

U.S. PATENT DOCUMENTS

| | | | |
|---|---|---|---|
| 5,426,282 A | 6/1995 | Humble | |
| 6,315,199 B1 | 11/2001 | Ito | |

(Continued)

FOREIGN PATENT DOCUMENTS

| | | | |
|---|---|---|---|
| CN | 106872006 A | 6/2017 | |
| CN | 209356047 U | 9/2019 | |

(Continued)

OTHER PUBLICATIONS

Wu, Bing-Fei, et al. "An intelligent self-checkout system for smart retail." 2016 International Conference on System Science and Engineering (ICSSE). IEEE, 2016. (Year: 2016).*

(Continued)

*Primary Examiner* — Nathan A Mitchell

(74) *Attorney, Agent, or Firm* — Kaufman & Canoles P.C.

(57) ABSTRACT

Systems and methods of automatically switching measurement information processing modes related to a self-checkout kiosk. In one exemplary embodiment, a method is performed by an electronic device that includes processing circuitry. The method may include detecting, using object recognition, at least one object present in real-time captured imagery. The method may further include, responsive to detecting the at least one object present in the real-time captured imagery, switching measurement information processing modes from a first measurement information processing mode to a second measurement information processing mode.

20 Claims, 8 Drawing Sheets

(51) Int. Cl.

| | |
|---|---|
| *G06T 7/20* | (2017.01) |
| *G06V 10/20* | (2022.01) |
| *G07G 1/00* | (2006.01) |
| *G07G 1/06* | (2006.01) |

(52) U.S. Cl.
CPC ......... *G06V 10/255* (2022.01); *G07G 1/0063* (2013.01); *G07G 1/0072* (2013.01); *G07G 1/06* (2013.01); *G06V 2201/07* (2022.01)

(58) Field of Classification Search
CPC .... G06T 7/62; G06V 10/255; G06V 2201/07; G06V 10/82; G06V 20/52; G07G 1/0063; G07G 1/0072; G07G 1/06; G07G 1/0054; G07G 3/003
See application file for complete search history.

(56) References Cited

U.S. PATENT DOCUMENTS

| | | | |
|---|---|---|---|
| 6,547,040 B2 | 4/2003 | Goodwin, III | |
| 6,550,583 B1* | 4/2003 | Brenhouse | A47F 9/048 |
| | | | 186/61 |
| 6,779,722 B1* | 8/2004 | Mason | A47F 9/046 |
| | | | 235/383 |
| 7,036,726 B1 | 5/2006 | Edwards | |
| 7,620,568 B1* | 11/2009 | Parker-Malchak | G06Q 20/20 |
| | | | 340/568.1 |
| 7,841,522 B2* | 11/2010 | Fortenberry | G07G 1/0054 |
| | | | 235/383 |
| 10,839,181 B1 | 11/2020 | Fjellstad | |
| 11,188,726 B1 | 11/2021 | Gururaja | |
| 11,481,751 B1 | 10/2022 | Chaubard | |
| 2003/0047387 A1 | 3/2003 | Bogat | |
| 2003/0078849 A1 | 4/2003 | Snyder | |
| 2005/0097064 A1 | 5/2005 | Werden | |
| 2008/0005036 A1* | 1/2008 | Morris | G01G 23/3735 |
| | | | 705/64 |
| 2008/0061139 A1* | 3/2008 | Roquemore | G01G 19/4144 |
| | | | 235/383 |
| 2011/0078033 A1* | 3/2011 | Bravo | G01N 21/4795 |
| | | | 705/23 |
| 2012/0055982 A1* | 3/2012 | Edwards | G01G 19/4144 |
| | | | 177/1 |
| 2012/0253953 A1 | 10/2012 | Aziz | |
| 2015/0054959 A1* | 2/2015 | He | G06V 10/40 |
| | | | 348/150 |
| 2016/0132854 A1* | 5/2016 | Singh | G07G 1/01 |
| | | | 705/16 |
| 2016/0189489 A1* | 6/2016 | Au | G06K 7/1413 |
| | | | 235/383 |
| 2017/0032304 A1 | 2/2017 | Charpentier | |
| 2019/0012883 A1* | 1/2019 | Takeno | G07G 1/009 |
| 2021/0125467 A1* | 4/2021 | Yepez | G07G 1/0072 |
| 2024/0220999 A1* | 7/2024 | Gao | G06V 10/25 |

FOREIGN PATENT DOCUMENTS

| | | |
|---|---|---|
| EP | 1850299 A2 | 10/2007 |
| JP | 2011113456 A | 6/2011 |

OTHER PUBLICATIONS

Fairbanks Scales, "Fairbans Scales Series 5 Mild Steel Bench Scales," <https://documents.fairbanks.com/literature/34343/100069.pdf> webpage accessed Oct. 8, 2021.

Uline, "Rubbermaid Digital Utility Scale—400 lbs x .5 lb" https://www.uline.com/BL_2203/Rubbermaid-Digital-Scales?pricode=WF331&AdKeyword=400%20lb%20scale&AdMatchtype=p&gclid=CjwKCAjw38SoBhB6EiwA8EQVLn-ewDKX-FyfJVRi-oxFddyCBotSG79esatdG-aSBwO2NfRfrtrkfhoCv7wQAvD_BwE.

Mogg, Trevor. "Walmart using A.I.-powered cameras to spot dodgy shoppers at self-checkouts". Retrieved from <https://www.digitaltrends.com/cool-tech/walmart-using-ai-powered-cameras-to-spot-shoplifters-at-self-checkouts/>. Originally published Jun. 2019. (Year: 2019).

* cited by examiner

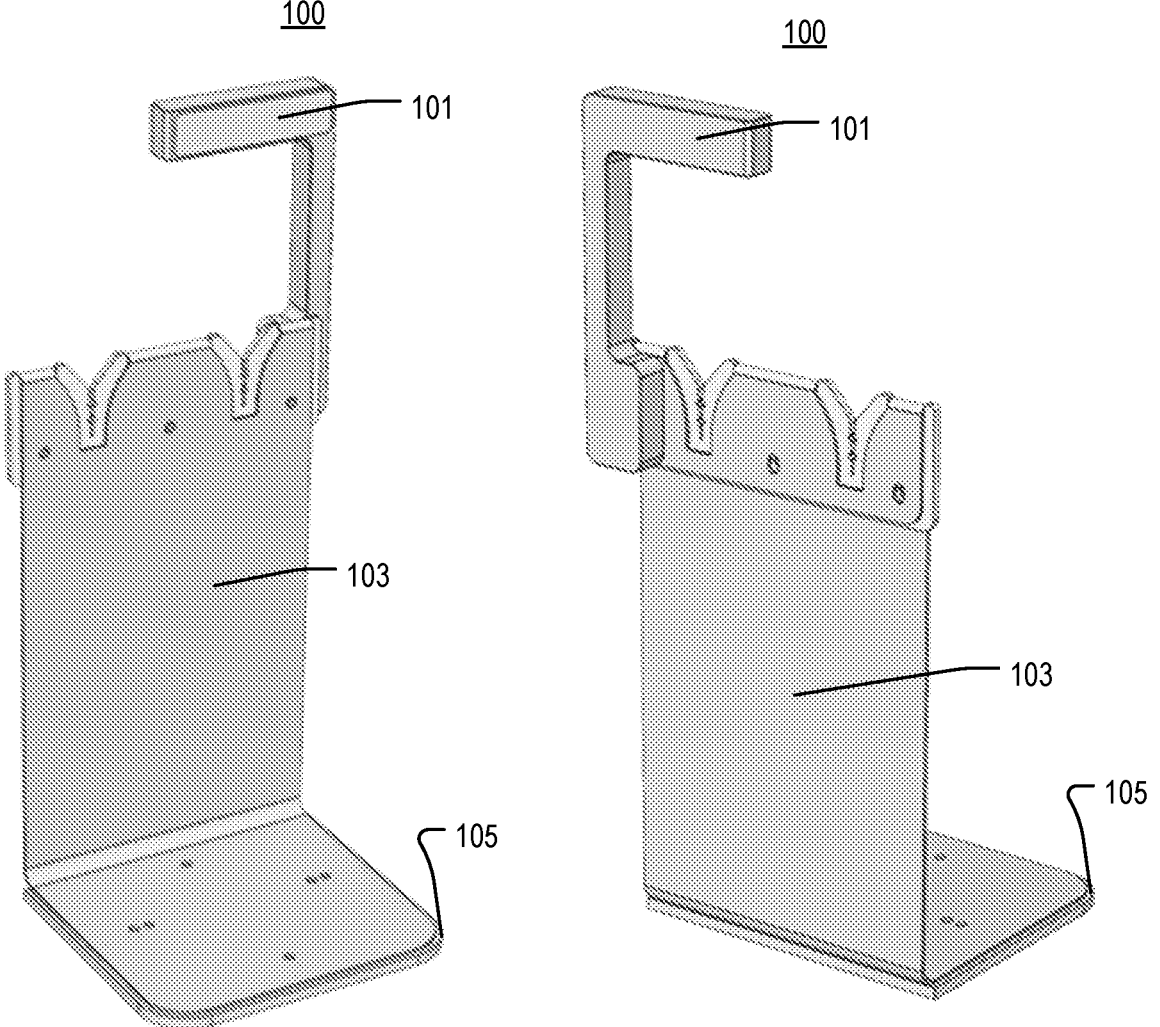
FIG. 1A          FIG. 1B

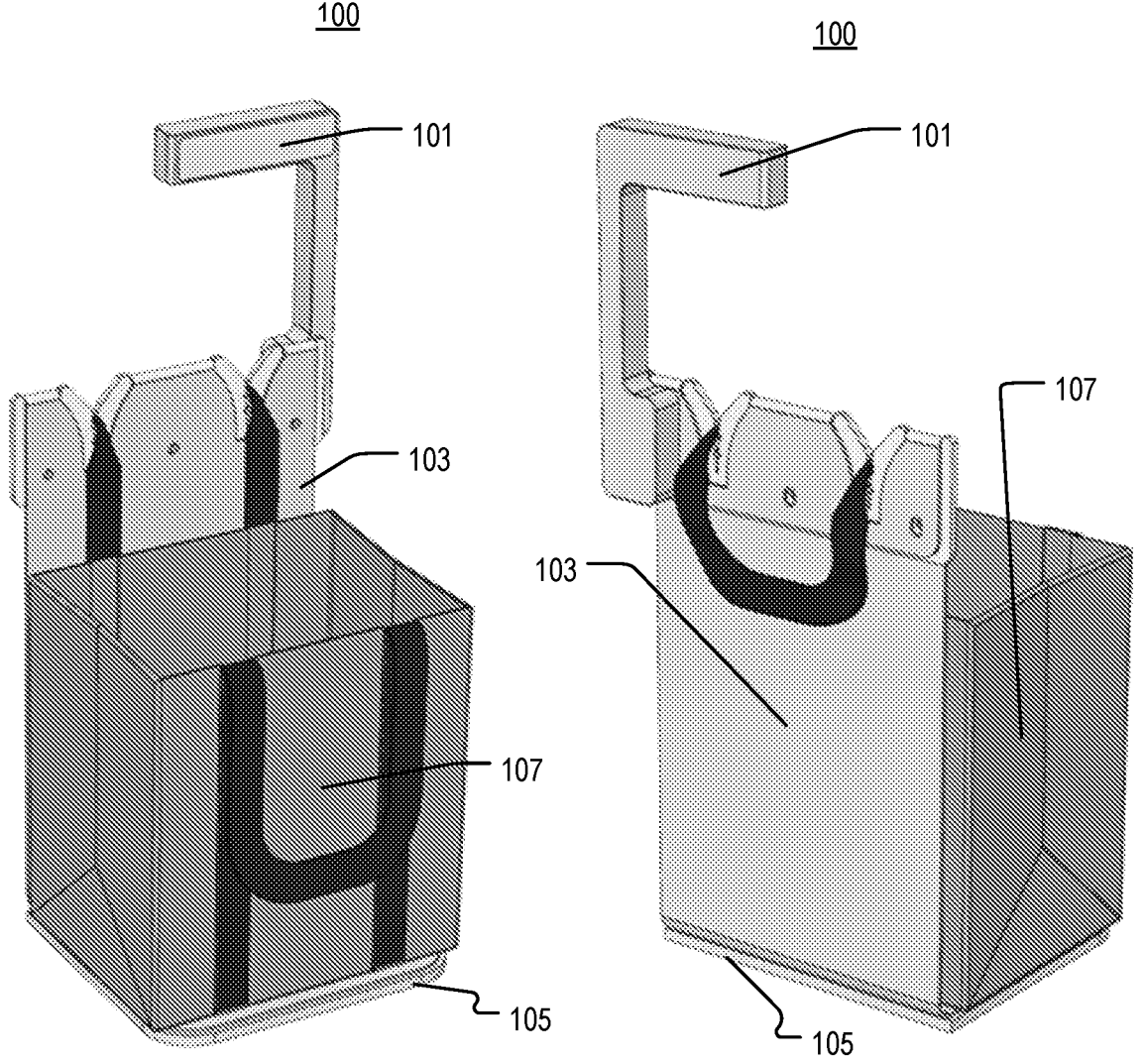
FIG. 1C            FIG. 1D

400

ACCESS REAL-TIME CAPTURED IMAGERY

401

DETECTING AT LEAST ONE TARGET OBJECT PRESENT IN THE REAL-TIME CAPTURED IMAGERY

403

SETTING (SWITCHING OR MAINTAINING) MEASUREMENT INFORMATION PROCESSING MODES

405

PERFORMING MEASUREMENT INFORMATION PROCESSING ACCORDING TO A CURRENT MEASUREMENT INFORMATION PROCESSING MODE

407

500

DETERMINE SECURITY CHECK MODE IS ENABLED

501

RESPONSIVE TO DETERMINING A SECURITY CHECK IS ENABLED, PERFORM ONE OR MORE OBJECT CHARACTERISTIC VALUE BASED SECURITY CHECKS

503

RESPONSIVE TO A SECURITY CHECK FAILING, PERFORM A SECURITY CHECK RELATED ACTION(S)

505

600

DETERMINE A MEASURED OBJECT CHARACTERISTIC VALUE OF THE TARGET OBJECT BASED ON THE MEASUREMENT INFORMATION

601

DETERMINE A PRICE OF THE TARGET OBJECT BASED ON THE MEASURED WEIGHT

603

UPDATE A LIST OF ITEMS TO BE PURCHASED TO ADD AN ITEM CORRESPONDING TO A TYPE OR BRAND OF THE TARGET OBJECT HAVING THE DETERMINED PRICE AND THE MEASURED CHARACTERISTIC VALUE

605

MEASUREMENT INFORMATION PROCESSING MODE SWITCHING SYSTEM

CROSS REFERENCE TO RELATED APPLICATIONS

This application is a continuation of U.S. patent application Ser. No. 17/543,271, filed Dec. 6, 2021, which is hereby incorporated by reference as if fully set forth herein.

BACKGROUND

Conventional retail bag racks may sit upon a security scale of a self-checkout kiosk after placement on a scanning scale (e.g., a scale located in a scanning or point of sale (POS) area, which may weigh and price, for example, produce). For individual weighing and pricing of items that do not have a standard identifier (e.g., a universal product code (UPC), a barcode or a quick response (QR) code), the scanning scale (e.g., a bioptic scanner scale that has two scanners and scans in two directions) may be unnecessary. The scanning scale in the self-checkout hardware can be large, heavy, and expensive to operate and maintain. In addition, the scanning scale requires additional space to be provided, and may be inefficient by requiring additional operator action (e.g., placing the item on the scanning scale). Every square inch is accounted for in the POS environment and maximized for optimizing the return of investment (ROI).

BRIEF DESCRIPTION OF THE DRAWINGS

The present disclosure will now be described more fully hereinafter with reference to the accompanying drawings, in which embodiments of the present disclosure are shown. However, the present disclosure should not be construed as limited to the embodiments set forth herein. Rather, these embodiments are provided so that the present disclosure will be thorough and complete, and will fully convey the scope of the present disclosure to those skilled in the art. Like numbers refer to like elements throughout.

FIGS. 1A and 1B illustrates one embodiment of a bag rack in accordance with various aspects as described herein.

FIGS. 1C and 1D illustrates one embodiment of a bag rack with a bag in accordance with various aspects as described herein.

DETAILED DESCRIPTION

Figure 2A:
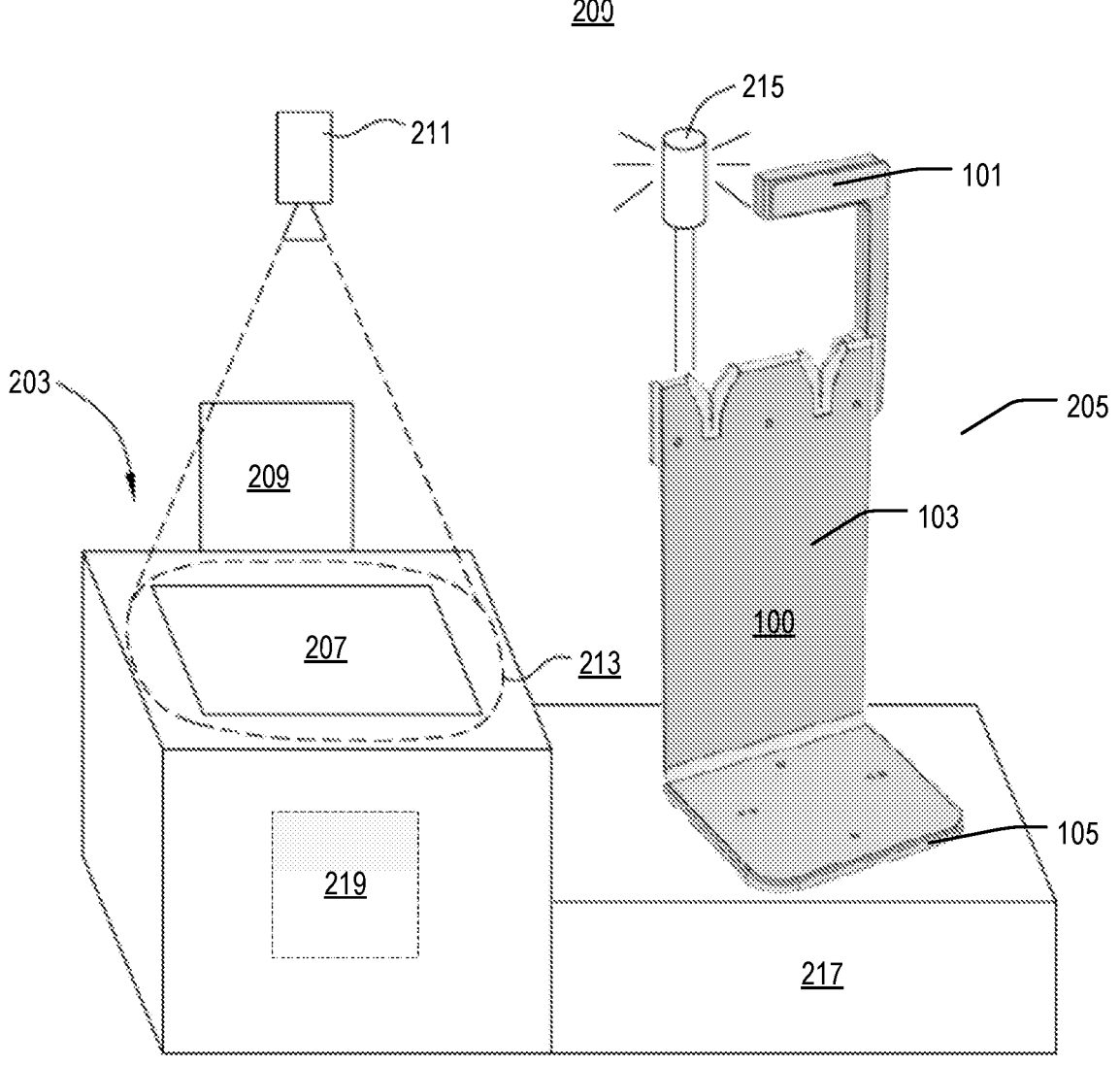
FIGS. 2A and 2B illustrate a self-checkout kiosk in accordance with various aspects as described herein.

For simplicity and illustrative purposes, the present disclosure is described by referring mainly to an exemplary embodiment thereof. In the following description, numerous details are set forth in order to provide a thorough understanding of the present disclosure. However, it will be readily apparent to one of ordinary skill in the art that the present disclosure may be practiced without limitation to these details.

Self-checkout kiosks are typically designed in such a way as to limit the size of the self-checkout lanes in order to improve ROI and reduce up-front and maintenance costs. It is desirable for a self-checkout kiosk or lane to have a reduced size to improve ROI and reduce up-front and maintenance costs. Accordingly, there is a need for improved techniques for performing measurement information processing with regards to POS systems integrated within a retail environment, such as at a self-checkout kiosk or other POS environments. Embodiments of the present disclosure relate to systems and methods of switching measurement information processing modes using processing circuitry of one of the described electronic devices. FIGS. 1A and 1B illustrate an exemplary integrated bag rack 100 for performing the method 400, the method 500 and the method 600 disclosed herein. The integrated bag rack 100 includes a built-in display 101, a retaining wall 103, and a built-in electronic scale 105 (an electronic measurement device). The display 101 is configured to display information regarding an item placed on the integrated scale 105. The displayed information provided by the display 101 may include an object characteristic value, such as a weight or quantity, and a determined price. The retaining wall 103 may be orthogonal to a main surface area of the integrated scale 105. The display 101 and the electronic scale 105 may be positioned at opposite ends of the retaining wall 103. The retaining wall 103 may be made out of a metal, such as stainless steel, or a plastic. The retaining wall 103 may include one or more hooks positioned on the end of the retaining wall 103 that the display 101 is connected to. The retaining hooks may be configured to hold straps of a reusable bag.

The electronic scale 103, which may be referred to as a produce scale, may include or be connected to a controller (e.g., a memory and processor) that records the measured object characteristic and records the measured object characteristic. The scale may also transmit information related to the measured object characteristic to the display 101 so that the display 101 displays the measured object characteristic (e.g, 0.8 lbs). The displayed information may also include a cost of the measured item (e.g., 0.8 lbs, $1.60 displayed for an item that is $2.00 per pound). In one example, the self-checkout kiosk 200 may include a display screen 209 or 209' that may indicate a total weight as items are put in a bag per bag rack space (e.g., if one integrated bag rack, one screen block with weight, if three integrated bag racks, three screen blocks with individual weights of each bag rack area).

In one example, the electronic scale 103 (e.g., used to weigh produce) can be located above or below the base of the bag rack 100. The electronic display 101 is attached to the bag rack and the bag rack is attached to the digital scale 105. In one example, the electronic display 101 is integrated into a bracket or arm which is attached to the back of the retaining wall 103 of the bag rack 100 and positioned directly over the center of the bag rack 100. In one example, the electronic display 101 and the electronic scale 103 are powered directly from a lane personal computer (PC) and include communication lines connected to the lane PC. In one embodiment, a battery or different external power source may be used for power. In one example, the scale 105 on the bag rack 101 performs two weight-based functions which include security and produce scale (e.g., methods 400, 500 and 600, described herein). As discussed further with regards to method 400 below, the processing circuitry of the bag rack 100 can perform the weighing and measurement calculation as a first measurement information processing mode (e.g., a security check measurement information processing mode) and then switch from security to produce scale measurement information processing mode when produce is being processed and back to security mode for non-produce items. Processing circuitry of the integrated bag rack 100 may include a connection to a POS or another computer to perform communication.

FIGS. 10 and 1D illustrate the exemplary bag rack 100 as described above, and further including a bag 107. The bag 107 is illustrated as a reusable bag in FIGS. 10 and 1D but may be a disposable bag. The retaining wall 103 may include bag hooks as shown in FIGS. 1A-1D that can be used to detachably connect the reusable bag to the retaining wall 103 of the bag rack 100. In another example, the bag rack 100 may include a T-shirt shaped retaining wall 103 that are configured to hold disposable plastic bags.

When a shopper begins their self-checkout transaction, the scale 105 may be zeroed-out prior to any items being scanned. When a reusable bag is being used, it can be positioned on the bagging-scale 105 prior to weighing any produce items.

Figure 2B:
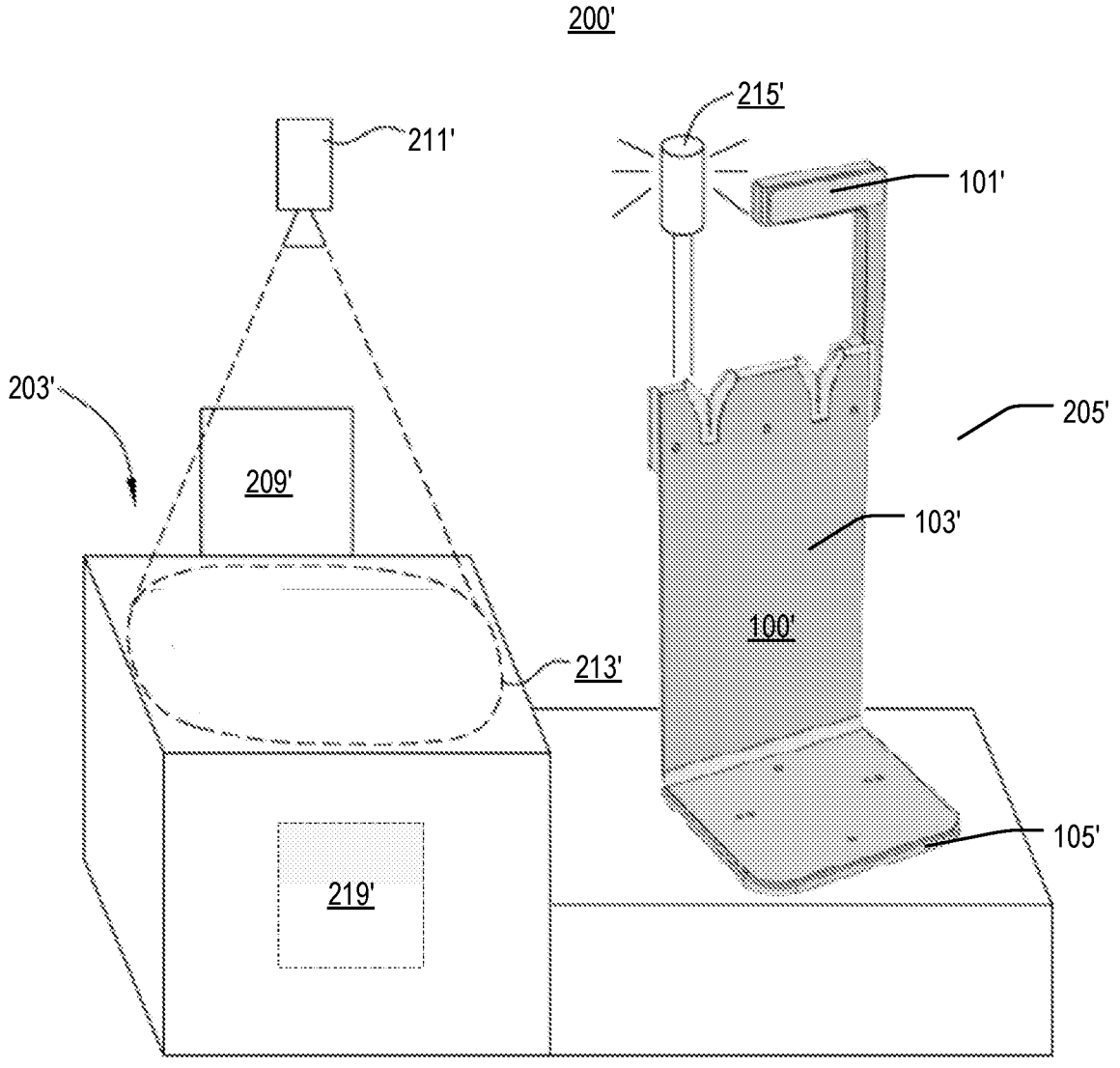

FIGS. 2A and 2B illustrate exemplary self-checkout kiosks 200 and 200'. The self-checkout kiosk 200 includes a bag rack 100 corresponding to the bag rack 100 discussed above. Although one bag rack with integrated scale is shown in each of FIGS. 2A and 2B, more than one bag rack with integrated scale may be provided in each self-checkout kiosk.

The self-checkout kiosk 200 includes a scan area 203 where a customer can arrange items and a bagging area 205 where a customer can place items after placement on the scanning area 203. The self-checkout kiosk 200 also includes a camera 211 that has a field of view 213 on the scan area 203. The self-checkout kiosk 200 includes a display screen 209 that can display a list of items to be purchased, such as scanned items, and other products (e.g., including produce that was identified and weighed), and instructions/prompts for the checking-out customer (e.g., for arranging the items, for completing payment). The self-checkout kiosk 200 also includes a light 215 that can be illuminated to draw the attention of store employees (e.g., in the event a security check fails).

In FIG. 2A, the scan area 203 may include a scanner scale 207 that can weigh and scan items. In FIG. 2B, there is not a scanner scale in the scan area 203' of self-checkout kiosk 200'. By adding a bag rack 100 with the integrated scale 105, the self-checkout kiosk 200 may have similar functionality (e.g., security measurement information processing, pricing measurement information processing) as the conventional self-checkout kiosk using less space. In one example, instead of requiring both a separate security scale 217 and a separate scanner scale 207 (as shown in FIG. 2A), the self-checkout kiosk 100' may include a bag rack 100 with integrated scale(s) 100' that performs two functions (security check and produce weighing) to replace the scanner scale 207 and security scale 217. In one example, the security scale 217 may be used by the processing circuitry with the integrated bag rack scale 105. In one example, the self-checkout kiosk includes the scanner scale 207 and the integrated bag rack scale 105. In one example, the self-checkout kiosk includes the security scale 217 and the integrated bag rack scale 105. The integrated scale 105 may have a quality that meets or is certified for weights and measures standards required for selling weight or measurement-based items (e.g., items having a cost based on weight). At whatever cost based on weight and so the idea was if we already have this piece of technology there.

The self-checkout kiosk 200 may also include a security scale 217 and a lane PC 219. Although the lane PC 219 may be a desktop PC, any electronic processing device (e.g., a tablet, a server, a mobile device) could be used that includes some or all of the processing circuitry as described herein. There may be one lane PC for each self-checkout kiosk, or the lane PC may manage multiple self-checkout kiosks. The security scale 217 and the lane PC 219 may be configured to perform the functionality of the method 500 (the first measurement information processing method) as described herein using the measurement information retrieved from the lane scale. In an exemplary embodiment, the lane PC 219 may be configured to perform the method 400, the method 500 and the method 600 using measurement information from the scale 105. The lane PC 219 may be configured to perform the method 400, the method 500 and the method 600 using measurement information obtained from the security scale 217. The security scale 217 may be located adjacent to the lane PC 219 and under a bagging area (e.g., where the bag rack 100 sits). The lane PC 219 may be located under the scanner 207, as shown in FIG. 2A but also could be located in a different location (e.g., under the security scanner 217).

In FIG. 2B, an apostrophe 0 is used to designate elements of the self-checkout kiosk 200' that are similar to the self-checkout kiosk and the functionality includes similar functionality as described above unless differences are described herein (e.g., the light 215 and the light 215' may have similar or the same functionality). FIG. 2B includes a self-checkout kiosk that may be similar to self-checkout kiosk 200 except that self-checkout kiosk 200' uses the scale of the bag rack 100 to retrieve the measurement information (e.g., for methods 500 and 600).

Figure 3:
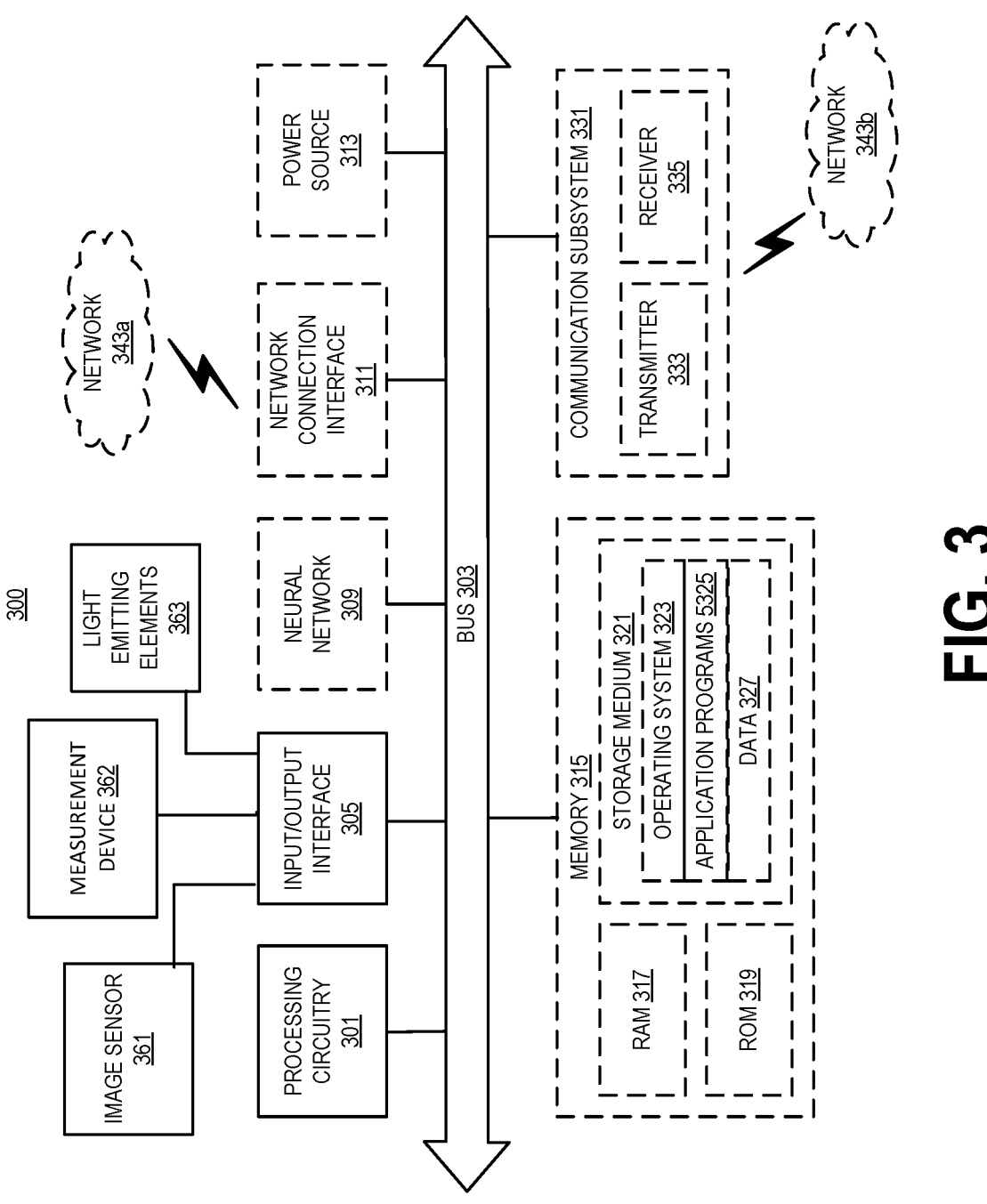
FIG. 3 illustrates an electronic device in accordance with various aspects as described herein.

FIG. 3 illustrates an embodiment of an electronic device 300 in accordance with various aspects as described herein. Electronic device 300 may correspond to the lane PC 219 and 219' described above. In FIG. 3, device 300 includes processing circuitry 301 that is operatively coupled to input/output interface 305, neural network circuitry 309, network connection interface 311, memory 315 including random access memory (RAM) 317, read-only memory (ROM) 319, and a storage medium 321 or the like, communication subsystem 331, power source 313, and/or any other component, or any combination thereof. Storage medium 321 includes operating system 323, application program 325, and data 327. In other embodiments, storage medium 321 may include other similar types of information. Certain devices may utilize the components shown in FIG. 3, or a subset of the components. The level of integration between the components may vary from one device to another device. Further, certain devices may contain multiple instances of a component, such as multiple processors, memories, neural networks, network connection interfaces, transceivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, field-programmable gate array (FPGA), application-specific integrated circuit (ASIC), etc.); programmable logic together with appropriate firmware; one or more stored program, general-purpose processors, such as a microprocessor or Digital Signal Processor (DSP), together with appropriate software; or any combination of the above. For example, the processing circuitry 301 may include one or more central processing units (CPUs). Data may be information in a form suitable for use by a computer. The electronic processor 112 may be, for example, a microprocessor, an ASIC, or another suitable CPU. The processing circuitry 301 may include an electronic processor generally configured to execute software instructions to perform a set of functions, including the functions/operations described herein.

In the depicted embodiment, input/output interface 305 may be configured to provide a communication interface to an input device, output device, or an input and output device. The device 300 may be configured to use an output device via input/output interface 305. An output device may use the same type of interface port as an input device. For example, a universal serial bus (USB) port may be used to provide input to and output from the device 300. The output device may be a peripheral device, such as, one or more of: a camera (e.g., image sensor 361), an electronic measurement device 362 (e.g., a sensor or digital scale), a speaker, a sound card, a video card, a display (e.g., display screen 209, 209'), a monitor, a printer, an actuator, an emitter, a smartcard, a light emitting element 363 (e.g., light 215), another output device, or any combination thereof. For example, the output device may be a set of light emitting elements 363, such as multiple light-emitting diodes (LEDs) while also including a display screen/monitor as discussed in this specification. The device 300 may be configured to use an input device via input/output interface 305 (e.g., scanner 207 or a keypad or personal identification number (PIN) pad that may include a credit card reader) to allow a user to capture or input information into the device 300. The input device may include a touch-sensitive or presence-sensitive display screen, an image sensor (e.g., a digital camera, a digital video camera, a web camera, etc., such as camera 211), a microphone, a sensor, a mouse, a trackball, a directional pad, a trackpad, a scroll wheel, a smartcard, and the like. The presence sensitive display screen may include a capacitive or resistive touch sensor to sense input from a user. A sensor may be, for instance, an accelerometer, a gyroscope, a tilt sensor, a force sensor, a magnetometer, an optical sensor, an infrared sensor, a proximity sensor, another like sensor, or any combination thereof. For example, the input device may include a mouse and a keyboard. In other examples, other input devices may be used, with or without the keyboard and mouse combination.

In FIG. 3, the neural network 309 may be configured to learn to perform tasks by considering examples. The neural network 309 is used for machine learning and a training set may be used to train the neural network as described herein. In one example, the neural network may be used to update parameters (e.g., thresholds, percentages). For example, the neural network 309 learns how to more accurately recognize or detect produce/product types or product brands based on a user input as disclosed herein. In other examples, additional neural networks may be stored in the memory. The neural network may be trained using machine learning. For example, hundreds of pictures of apples could be used to train the neural network to learn the basics of what an apple looks like. The learning may be performed in an ongoing basis with supervised learning. For example, next time an apple is detected by the produce recognition camera, a user may be prompted to confirm that the apple is actually an apple, or that multiple apples are apples. Although produce (e.g., apples) are used as an example, other items that are not pre-packaged could be used, such as candy, or spices (size of granular pieces and color range), to train the neural network to identify the respective items. Any transaction based on weight or another characteristic could be recognized using the neural network.

The item could be recognized inside of a bag and scanning would not be required for this item, and no buttons would need to be touched (except possibly for the training). Also, the scale could be in the bag rack (instead of where the item is placed for recognition). The trained neural network may be provided on the edge (e.g., a processor in the camera, in the lane PC, or other processing circuitry). The neural network may be trained at each store location to be personalized for each store. A human may be involved for auditing to ensure that the captured image is correctly categorized during the training or supervised learning.

In some examples, the camera can track movement of the target object, and perform the switching from the first measurement information processing mode to the second measurement information processing mode after detecting the target object has been placed in a bag associated with the bag rack attached to the digital scale based on tracking of the movement of the target object.

The network connection interface 311 may be configured to provide a communication interface to network 343a. Portions of the network 343a may be implemented using wired and/or wireless networks such as a local-area network (LAN), a wide-area network (WAN), the Internet a computer network, a wireless network, a telecommunications network, another like network or any combination thereof. For example, network 343a may comprise a Wi-Fi network. In other examples, a dedicated communication channel may also be used or in place of the network connection interface 311. The network connection interface 311 may be configured to include a receiver and a transmitter interface used to communicate with one or more other electronic devices over a communication network according to one or more communication protocols, such as Ethernet, transmission control protocol/Internet protocol (TCP/IP), synchronous optical networking (SONET), asynchronous transfer mode (ATM), or the like. The network connection interface 311 may implement receiver and transmitter functionality appropriate to the communication network links (e.g., optical, electrical, and the like). The transmitter and receiver functions may share circuit components, software or firmware, or alternatively may be implemented separately.

The RAM 317 may be configured to interface via a bus 303 to the processing circuitry 301 to provide storage or caching of data or computer instructions during the execution of software programs such as the operating system, application programs, and device drivers. The ROM 319 may be configured to provide computer instructions or data to processing circuitry 301. For example, the ROM 319 may be configured to store invariant low-level system code or data for basic system functions such as basic input and output (I/O), startup, or reception of keystrokes from a keyboard that are stored in a non-volatile memory. The storage medium 321 may be configured to include memory such as RAM, ROM, programmable read only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 321 may be configured to include an operating system 323, an application program 325 such as methods 400, 500 and 600, a widget or gadget engine or another application, and a data file 327. The storage medium 521 may store, for use by the device 500, any of a variety of various operating systems or combinations of operating systems.

The storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 321 may allow the device 300 to access computer-executable instructions, application programs or the like, stored on transitory or non-transitory memory media, to off-load data, or to upload data. An article of manufacture, such as one utilizing a communication system may be tangibly embodied in the storage medium 321, which may comprise a device readable medium. The computer executable instruction may be configured to cause a processor to perform some of the functionality of the methods 400, 500 and 600. The computer-executable instructions can be stored on a non-transitory computer readable medium storing computer-executable instructions that, when executed by processing circuitry, cause the processing circuitry to perform certain functions.

In FIG. 3, the processing circuitry 301 may be configured to communicate with network 343b using the communication subsystem 331. The network 343a and the network 343b may be the same network or networks or different network or networks. The communication subsystem 331 may be configured to include one or more transceivers used to communicate with the network 343b. For example, the communication subsystem 331 may be configured to include one or more transceivers used to communicate with one or more remote transceivers of another device capable of wireless communication according to one or more communication protocols, such as Institute of Electrical and Electronics Engineers (IEEE) 802.11, Code-division multiple access (CDMA), Wideband CDMA (WCDMA), Global System for Mobile Communications (GSM), Long-Term Evolution (LTE), Radio Access Network Architecture of 3G UMTS (UTRAN), Worldwide Interoperability for Microwave Access (WiMax), or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of the communication subsystem 331 may include data communication, voice communication, multimedia communication, short-range communications such as Bluetooth, near-field communication (NFC), location-based communication such as the use of the global positioning system (GPS) to determine a location, another like communication function, or any combination thereof. For example, the communication subsystem 331 may include cellular communication, Wi-Fi communication, Bluetooth communication, and GPS communication. For example, a payment card may be slid/inserted at a point of sale (e.g., via a card reader), or a mobile device (or card) with NFC may be used to tap for payment. The network 343b may encompass wired and/or wireless networks such as a local-area network (LAN), a wide-area network (WAN), a computer network, the Internet, a wireless network, a telecommunications network, another like network or any combination thereof. For example, the network 343b may be a cellular network, a Wi-Fi network, and/or a near-field network. The power source 313 may be configured to provide alternating current (AC) or direct current (DC) power to components of the device 300.

The features, benefits and/or functions described herein may be implemented in one of the components of the device 300 or partitioned across multiple components of the device 300. Further, the features, benefits, and/or functions described herein may be implemented in any combination of hardware, software or firmware. In one example, communication subsystem 331 may be configured to include any of the components described herein. Further, the processing circuitry 301 may be configured to communicate with any of such components over the bus 303. In another example, any of such components may be represented by program instructions stored in memory that when executed by the processing circuitry 301 perform the corresponding functions described herein. In another example, the functionality of any of such components may be partitioned between the processing circuitry 301 and the communication subsystem 331. In another example, the non-computationally intensive functions of any of such components may be implemented in software or firmware and the computationally intensive functions may be implemented in hardware.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium. In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by an electronic computing device. This computer program product may be stored on a computer readable recording medium.

In the present disclosure, systems and methods of performing measurement information processing using processing circuitry of one of the above-described or below described electronic devices. In one example, FIG. 3 illustrates a networked electronic device 300 corresponding to a lane PC that performs the methods 400, 500 and 600 disclosed herein.

Figure 4:
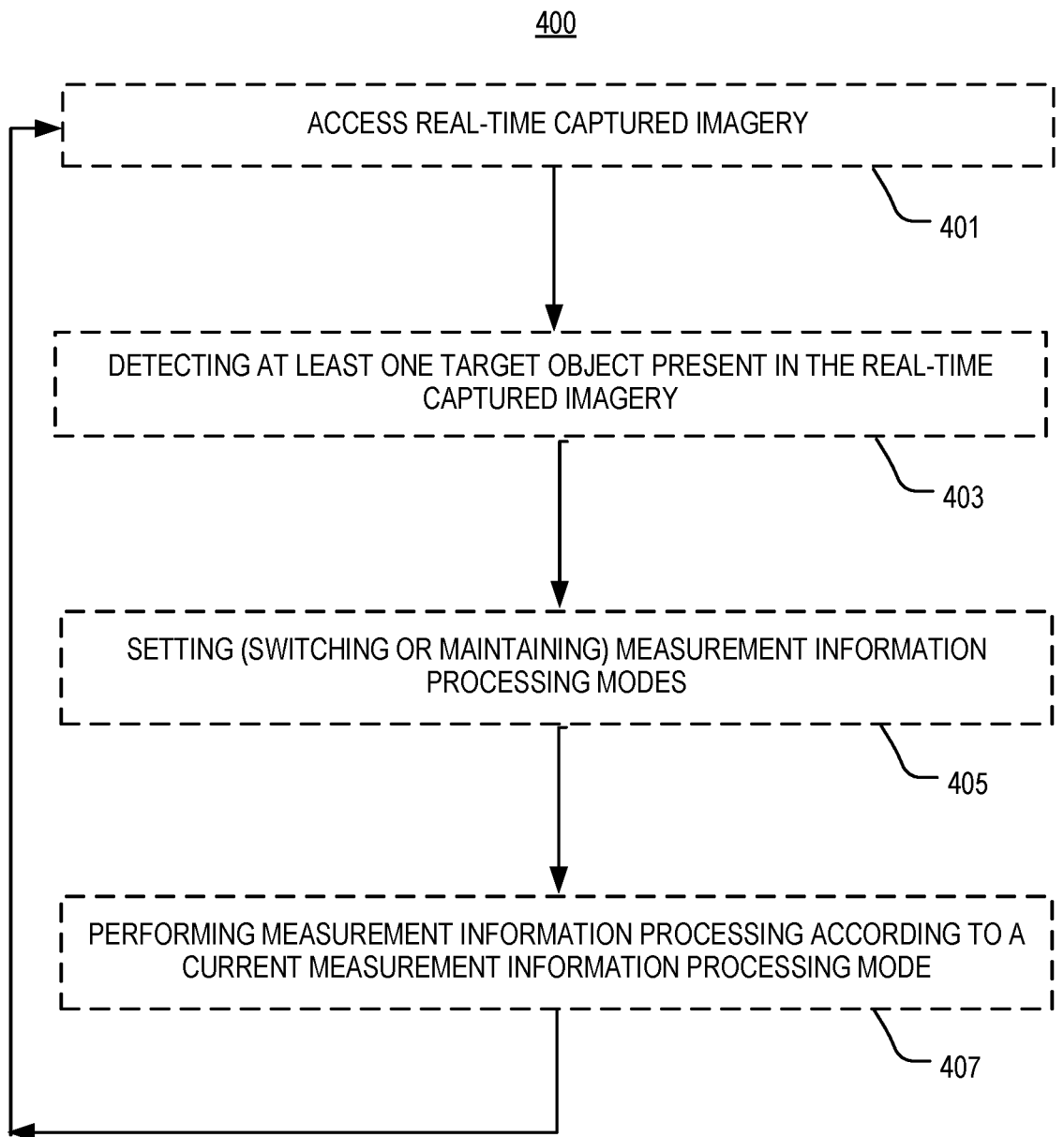
FIG. 4 illustrates one embodiment of a method of automatically setting or switching measurement information processing modes related to a self-checkout kiosk and performing the set or switched to measurement information processing mode in accordance with various aspects as described herein.

FIG. 4 illustrates one embodiment of a method 400 of automatically switching measurement information processing modes related to a self-checkout kiosk and performing the set or switched to measurement information processing mode using processing circuitry of one of the above-described or below described electronic devices in accordance with various aspects as described herein. In FIG. 4, the method 400 may start, for instance, at block 401 where it may include accessing real-time captured imagery retrieved from a camera (e.g., camera 211 or 211). In the present disclosure, the camera 211 or 211' may continuously capture video in the scanning area 213. At block 403, the method 400 may include detecting, by the processing circuitry, using object recognition, at least one target object present in the real-time captured imagery. The detection of the at least one target object may include detecting the at least one target object from a set of predetermined target objects. For example, the set of predetermined object may be of a certain type (e.g., a produce type, a product brand, or a combination thereof). The target object may be recognized and categorized, using object recognition, based on a produce type, a product type or a product brand, respectively, from among a set of predetermined produce types, product types and product brands.

According to an exemplary embodiment, the processing circuitry may use a camera to detect objects (e.g., produce objects) in real-time captured imagery, and identify a produce type or a produce brand of each detected produce object. The produce type or product brand of the target object corresponding to an item identifier and a price per object characteristic unit (e.g., a price per weight unit, such as a price per pound). In one example, as produce is placed directly into a bag on the bagging-scale 105, the customer can be prompted to identify the type of produce in the bag through inputs on a monitor or display (e.g., display screen 209 or display 101), if not by product-recognition technology. Once identified, the bagging scale display shows the total weight and price of the item. The scale is then reset again and the customer can then continue to place more produce items into the same bag rack. If the bag is filled and removed, a new bag can make ready on the bag rack the process starts over again when the next produce item is weighed and identified.

In other examples, the item type (e.g., produce type or product brand) is identified by other methods. For example, a stand-alone scale could be placed in a produce section, and attached to a barcode printer that prints out a barcode for weighed produce. The scale could include a user interface that enables a user to enter a product lookup (PLU) number, PIN code (e.g., a four digit PIN code on a sticker attached to the product) or text string, or to tap a button corresponding to an item type (e.g., a picture of a banana). With this hardware, the user interface enables the customer to either punch the number corresponding to the item type in or looks it up. As other examples, a universal product code (UPC) or barcode could be used instead of or in combination with the PLU. Using the integrated bag rack 100 with the produce recognition camera eliminates the need to perform that step (and hence increases throughput). In addition, during and after a pandemic, there is a desire to minimize user touch interactions (e.g., with touch screen display devices that provides the touch user interface). As an example, the produce recognition camera may determine that a customer has an orange in his hand. In one example, the orange must be placed on the scale or a table to be identified.

At block 405, the method 400 may include setting (e.g., switching or maintaining), by the processing circuitry, a measurement information processing mode. For example, block 405 may include switching from a first measurement information processing mode to a second measurement information processing mode. Although two measurement information processing modes are discussed more than two measurement information processing modes can be used (e.g., two or more modes for different categories of items).

The operations at block 405 may be performed responsive to detecting the at least one target object present in the real time captured imagery from among a set of detectable objects. For example, the detecting of the at least one target object may include detecting a produce type or product brand of an item or object (e.g., an apple) placed or held at a certain location (e.g., in a field of view of a camera). Blocks 403, 405 and 407 may be performed while accessing the real-time captured imagery from the camera (Block 401 may be continuously repeated). That is, the captured imagery may be monitored. The monitoring of the captured imagery may begin based on an activation (e.g., a user pressing a button on the display 101 or 101' or 209 or 209'), and multiple items may be recognized and processed. In some examples, the trigger to begin method 600 is detection of produce, when the produce is placed in the bag, the switch has already occurred to place the current mode into the produce weight measurement mode (a weights and measures mode). After the produce weight measurement mode finishes processing, the current measurement information processing mode could switch back to the first measurement information processing mode (the security check mode).

The second measurement information processing mode may be different from the first measurement information processing mode, as discussed in more detail below. The first and second measurement information processing modes process measurement information retrieved from the electronic measurement device (e.g., digital scale) in real-time.

The first processing mode is a security check measurement information processing mode that includes performing a security check related action responsive to a security check failing. The security check, to perform loss prevention, may fail responsive to the measured object characteristic value exceeding a tolerance threshold in comparison with an expected object characteristic value of the target object.

The second measurement information processing mode determines a measured object characteristic value of the detected target object present in the real-time captured imagery. The object characteristic value may include a weight. In other examples, the object characteristic is not limited to weight, and the object characteristic may include at least one of a weight of the target object, a mass of the target object, a volume of the target object, an area or the target object, a length of the target object, a width of the target object, a number of target objects, or a size of the target object.

At block 407, the method 400 may include performing, by the processing circuitry, measurement information processing according to a current measurement information processing mode. For example, the current measurement information processing mode is set in block 405 (e.g., the second information processing mode that was switched to responsive to the at least one target object, such as from one or more of the set of predetermined objects, being present in the real-time captured imagery). In one example, the processing circuitry may further switch back to the first measurement information processing mode after a predetermined period of time after the measured object characteristic value of the target object has been determined. In one example, the switch back to the first measurement information processing mode occurs after a predetermined period of time after the measured object characteristic value of the target object has been determined elapses.

The conventional self-check-out technology did not provide the capability to capture an object characteristic (e.g., a weight) to be priced, and has not been used for dual measurement purposes. In the conventional technology, to measure an object characteristic value (e.g., a weight) of an item that is priced based on the measured object characteristic, a self-checkout kiosk may include two digital scales: a security scale below a bag rack for performing a security check, and a product scale. The self-checkout bag rack 100 with integrated weight scale 105 and display 101 (all-in-one display, bagger and weight scale) improves transaction throughput speed by reducing the number of times a shopper has to move an item from, for example, the basket to the scanner scale to the bag rack. With the integrated weight scale 105, the item can more efficiently move directly from the basket to the bag rack. Moreover, the scanner scales are big, heavy and costly. One scale may be used for two purposes instead of two scales.

Figure 5:
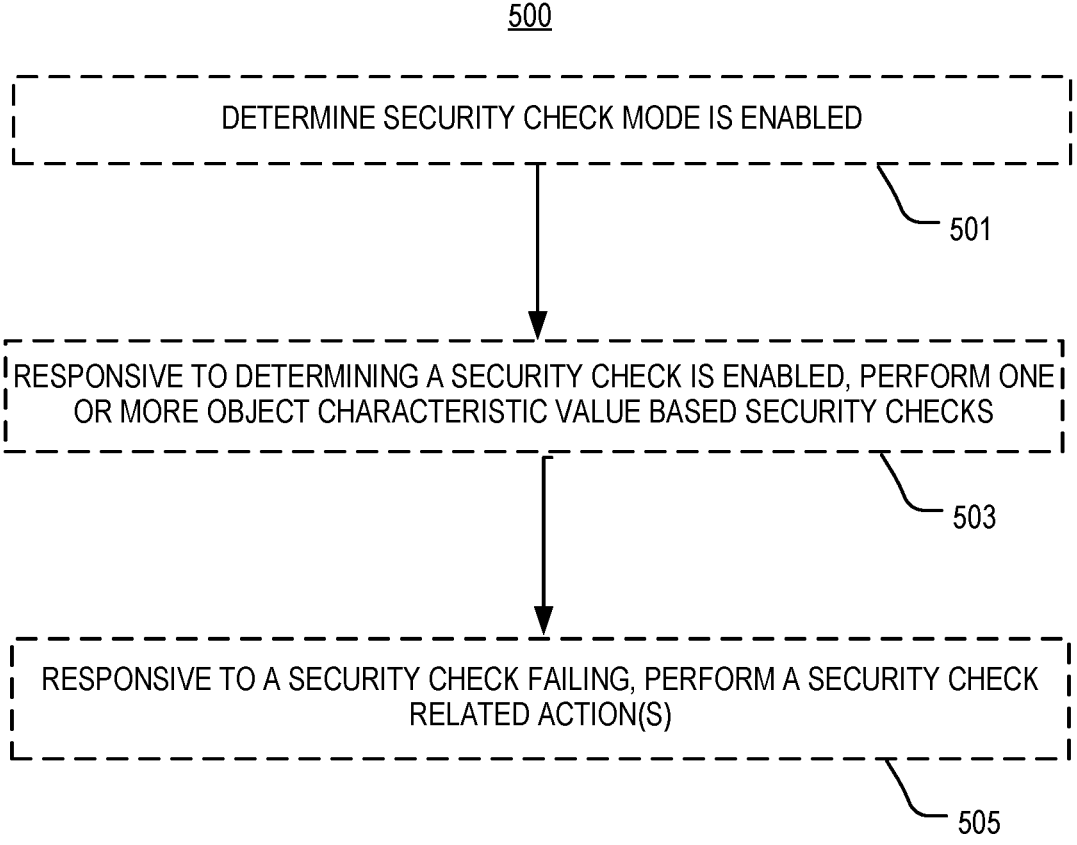
FIG. 5 illustrates one embodiment of performing a measurement information processing mode in accordance with various aspects as described herein.

FIG. 5 illustrates one embodiment of a method 500 of performing measurement information processing according to a first measurement information processing mode. In some examples, the first measurement information processing mode is a security check measurement information processing mode that includes performing a security check related action responsive to a security check failing. According to some examples, the security check fails responsive to the measured object characteristic value being outside of a tolerance threshold in comparison with an expected object characteristic value of the target object.

For example, the first measurement information processing mode may include using the measured object characteristic information (e.g., a weight) to perform a security check(s). In FIG. 5, the method 500 may start, for instance, at block 501 where it may include determining a security check mode is enabled. A user operator (e.g., a grocery store employee) may have control to enable or disable the security check mode. For example, retailers can turn the security check off during certain peak times to increase serial throughput. Other security checks could also be used (e.g., customer behavior monitoring) without utilizing the scale. At block 503, the method 500 may include performing, by the processing circuitry, one or more object characteristic value-based security checks. Block 503 may be performed responsive to determining the security check is enabled. Responsive to the security check mode being disabled, the security checks (Block 503) and related action (Block 504) are not performed.

Block 503 may include performing one or more object characteristic value-based security checks. Block 501 may be optionally used as a pre-requisite operation, or block 501 may be omitted (e.g., an always-on security check mode that cannot be disabled). The performing of the one or more object characteristic value-based security checks may include verifying a characteristic of a product that was scanned or otherwise entered for purchase with a same object characteristic value measured by a different electronic device (e.g., a digital scale). For example, if the self-checkout kiosk is located in a grocery store, then the items for purchase may include boxed goods (e.g., cereal and pasta), canned goods (e.g., soups and vegetables), paper products (e.g., paper towels and napkins), produce (e.g., fruits and vegetables), prepared foods, and other products. These products (and others) may require different types of security checks to ensure that the customer is purchasing the correct items. For example, boxed goods, canned goods, and paper goods, may be weighed to ensure that the customer is purchasing the correct sizes, and to avoid theft (e.g., skip scanning, missed scans, where a customer scans one item but places a different item having a different weight in the bagging area). As another example, certain produce (e.g., bananas and apples) and prepared foods may need to be weighed to ascertain a price for the items. As another example, certain produce (e.g., avocados) may need to be counted (to derive a quantity) to ascertain a total price of the item(s) based on a price per number. For other goods, computerized security checks may be ineffective or impractical, and such items may be passed around any security checks. For example, it may be impractical for customers to place large, heavy bags of dog food on a scale for security check verifications. As another example, it may be ineffective to place very light items (e.g., greeting cards) and/or fragile items (e.g., flower bouquets) on a scale for verification.

Each item for purchase can be associated with a security check category in a database of a lane PC. For example, as discussed above, dry goods, such as boxes of cereal or pasta, may be available in different sizes, resulting in different weights. As a result, such dry goods items could be associated with a security check category that requires the items to be weighed to ensure that the item on the list matches the item actually being purchased (i.e., the most recently scanned or entered item). In block 503, each item on the list can be associated with a security check category.

The item to be purchased may be identified based on the item being scanned in a scanning area of a self-checkout kiosk, based on object detection/recognition via a camera above the scanning area of the self-checkout kiosk, based on user input (e.g., a product lookup number), or a combination thereof. A lookup operation using the product look up number can be performed to identify the security check category associated with the identified item to be purchased (block 503). This lookup operation may be performed while the customer is shopping (e.g., when entered via mobile device) or after the customer is finished shopping. For example, when the user approaches a point-of-sale (POS) device and/or indicates to the mobile payment device that he is done shopping, the scanned or otherwise entered items can be compiled into a list, and a lookup operation can be performed on each item in the list to identify a security check category for each item.

Responsive to the expected object characteristic value (e.g., the expected weight) of the most-recently scanned/entered/identified item to be purchased not corresponding (e.g., is not within a threshold value, such as a percentage or number (e.g., within 0.1 lbs)) to the measured object characteristic value change (e.g., weight change) as actually measured by the scale, the security check may fail. When the expected object characteristic value corresponds or matches (e.g., within the predetermined threshold value), the security check does not fail, and no security check related action occurs. Responsive to the security check failing, in block 505, a security check related action may be performed. The security check related action may include causing the light above the self-checkout kiosk to illuminate or flash to alert store employees, and may include transmitting a communication (e.g., an email or text message alert to a device of an employee of the grocery store regarding the security check failure). The security check related action may include displaying or audibly outputting a message, such as "weights don't match from what you scanned" or "please place correct item in bagging area" or another suitable alert or prompt information.

Figure 6:
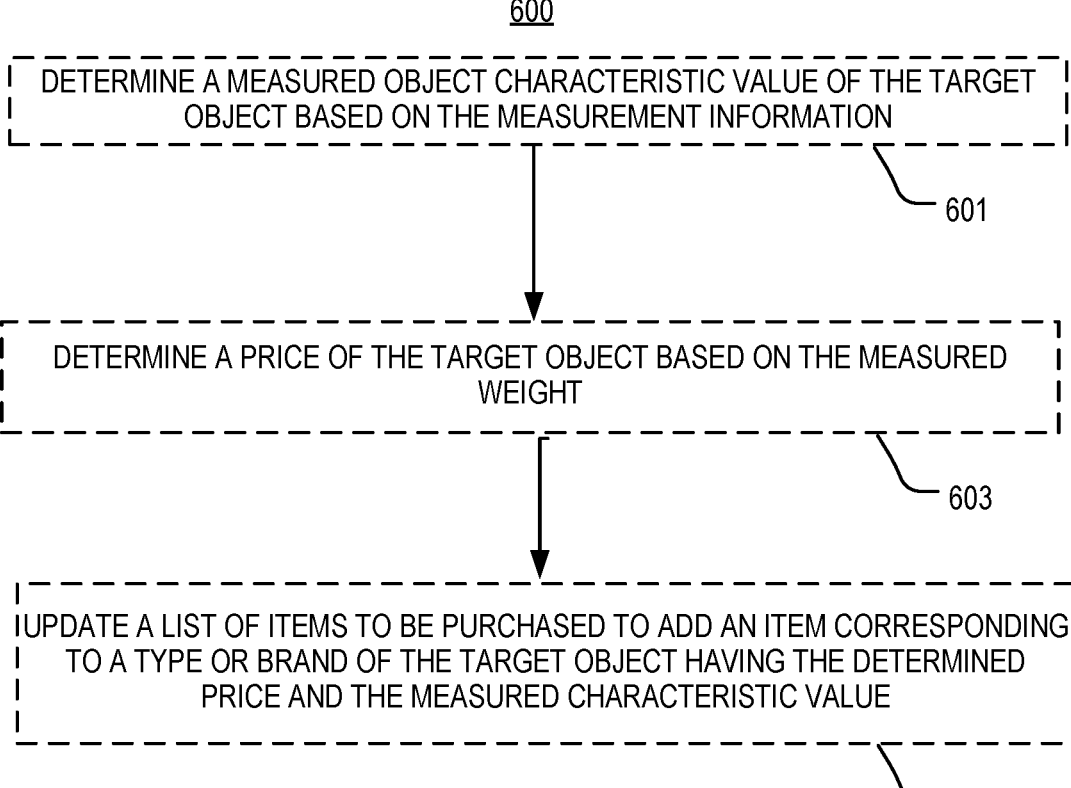
FIG. 6 illustrates another embodiment of performing a measurement information processing mode in accordance with various aspects as described herein.

FIG. 6 illustrates one embodiment of a method 600 of performing measurement information processing according to a second measurement information processing mode. For example, the second measurement information processing mode may include using the measured information (e.g., a weight) to determine a sale price of produce that must be weighed. In FIG. 5, the method 600 may start, for instance, at block 601 that includes determining the measured object characteristic value (e.g., a measured weight) of the target object based on the measurement information retrieved from the electronic measurement device (e.g., the digital scale). In one example, block 601 may include determining the measured object characteristic of the target object based on the measurement information retrieved from the electronic measurement device. In one example, block 601 may include determining a measured weight of the target object based on the measurement information retrieved from the digital scale.

In one example, the measurement information retrieved from the electronic measurement device in block 601 is retrieved after a predetermined amount of settling time has elapsed. The predetermined amount of time of settling time is at least one second. The produce recognition camera can transmit an alert to notify the scale to begin weighing the produce. The settling time may occur after the scale is zeroed-out. The settling time allows the target object to settle (e.g., to stop moving around as the target object is placed in the bag, to allow a shopper's hand to move away from the bag). The settling time is used to provide a more accurate measurement free from interference. The settling time can be two seconds.

At block 603, the method 600 may further include determining, by the processing circuitry, a price of the target object based on the measured object characteristic value (e.g., the measured weight). The determining of the price of the target object based on the object characteristic (e.g., weight) may include: identifying a produce type or product brand of the target object, from among a set of predetermined produce types and product brands, by using the object recognition on the real-time captured imagery; identifying a price per object characteristic unit of the identified produce type or product brand; and determining the price of the target object based on multiplying the identified price per object characteristic unit (e.g., the price per weight unit) by the measured object characteristic value of the target object (e.g., the measured weight) that is based on the measurement information retrieved from the electronic measurement device in real-time.

The method 600 may include one or more security checks, such as those in method 500. In one example, because the weight of the item is being captured by potentially the same scale, a range of values may be stored categorized by item type or product brand. For example, a certain type of apple may have an expected weight within a range of 0.5 lbs. to 1.5 lbs. In one example, a security check may be performed in block 603 that includes verifying or validating that the recognized target object corresponds to what was actually placed in the bag by using the expected weight range of the identified item. This validation or verification technique allows accurate order generation and avoids a different heavy or light item placed inside of an apple exterior.

At block 605, the method 600 may include updating, by the processing circuitry, a list of items to be purchased to add an item name corresponding to a type or brand of the target object in association with the determined price and the measured object characteristic (e.g., the measured weight). According to an exemplary embodiment, the processing circuitry may further control a touch screen display to display a name of the produce type or product brand of the target object added to the list of items to be purchased, and a confirmation button, and receive a user input on the confirmation button indicating that the displayed name of the produce/product type or product brand corresponds to the produce/product type or product brand of the target object. For example, the touch screen display may be programmed to include some of the same display functionality as the display 209 or 209' of FIGS. 2A and 2B. The processing circuitry may further use a neural network (e.g., neural network circuitry 309) in the object recognition, and the neural network learns how to more accurately recognize or detect produce/product types or product brands based on the user input on the confirmation button.

Although weight is used as an exemplary object characteristic, other object characteristics (e.g., count/quantity, etc.) may be used for pricing of a target object. Additionally, although target object is singular, the target object may refer to more than one item (e.g., three lemons at $0.90 per lemon). In other examples, the measured object characteristic value is not limited to weight or count, and the object characteristic may include at least one of a weight of the target object, a mass of the target object, a volume of the target object, an area or the target object, a length of the target object, a width of the target object, a number of the target objects (count/quantity), or a size of the target object.

According to an embodiment, the bag rack 100 with integrated digital scale and display may be provided as a standalone system. The bag rack 100 may be provided in, for example, a produce section of a grocery store where the bag rack 100 is provided at a different location than the self-checkout kiosk. The bag rack may include a processor and a portion of the components of the lane PC. The processor of the bag rack may perform the method 600. The processor of the bag rack may perform accessing real-time captured imagery from the camera, while accessing the real-time captured imagery from the camera, detecting, using object recognition, at least one target object present in the captured imagery, and responsive to detecting at least one target object present in the captured imagery, identifying a type or brand of the at least one target object present in the captured imagery, determining a price per weight unit of the identified type or brand of the at least one target object based on measurement information retrieved from the digital scale in real-time, and determining the price of the at least one target object based on multiplying the identified price per weight unit by the measured weight of the target object. The method performed by the bag rack may further include controlling a display attached to the bag rack to display at least one of the measured weight of the target object, or the determined price of the target object. A label printer may be provided to print a label that displays the at least one of the measured weight of the target object, or the determined price of the target object.

In one example, the bag rack 100 with integrated scale 105 may be located away from a POS (e.g., the self-checkout kiosk) or the POS may be provided via a mobile device. For example, the bag rack 100 may be located in a produce section of a grocery store. For example, in frictionless check-out that is driven by cameras or to supplement an already-placed online order (e.g., curbside pick-up), a user can supplement an existing order or begin a new order by adding measurement priced items (e.g., weight or quantity priced produce). The existing order may include boxed goods or canned items before and after the measurement priced item is added. Although customers may not care to choose between boxed/canned items, customers may want to look at and choose produce (e.g., fruits and vegetables) to have the correct ripeness, size, and shape, and to avoid bruises, etc.

In one example, the bag rack 100 may include processing circuitry that includes a communication interface so that the scale 105 of the bag rack 100 is networked into the POS (e.g., wirelessly or hard connected to facilitate locating in the produce section). A customer could then enter the grocery store to pick-up an online order (e.g., cans, bottles and boxes and other items) and use the integrated bag rack 100 (e.g., in the produce section) to weigh and add produce, which can be married up to the customer's previously-placed existing order. The integrated bag rack and scale 100 may provide another benefit of immediately charging a customer for produce, which avoids the situation of a customer attempting to re-stock produce.

The detailed description above is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and FPGAs and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more ASICs, in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a LAN. Of course, a person of ordinary skill in the art will recognize many modifications may be made to this configuration without departing from the scope or spirit of the subject matter of the present disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include", and its various forms are intended to mean including but not limited to. References to "one embodiment," "an embodiment," "example embodiment," "various embodiments," and other like terms indicate that the embodiments of the disclosed technology so described may include a function, feature, structure, or characteristic, but not every embodiment necessarily includes the function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a point of sale (POS) system having processing circuitry operationally coupled to an optical sensor device having a field of view about the POS system and operable to capture image data representing an image and to a scale device operable to measure a weight of an object placed on a surface of the scale device, capturing, by the optical sensor device, the image data representing an image of a target object prior to any barcode scan of the target object;

analyzing, by the processing circuitry, the captured image data to determine, based on one or more visual features of the target object and without reliance on barcode data, product lookup information or saleable item transaction data, an object type or classification of the target object; and in response to the determined object type or classification, selecting, by the processing circuitry, prior to processing of a weight measurement of the target object, that a process enabled by the weight measurement of the target object operates in a first or second processing mode, wherein the first processing mode is associated with a security verification operation that includes determining that the weight measurement of the target object corresponds to an expected weight of an object having the same object type or classification of the target object, and the second processing mode is associated with a pricing operation that includes determining a price of the target object based on the weight measurement of the target object for an object type or classification that requires the weight measurement to determine the price of the target object.

2. The method of claim 1, further comprising:

obtaining the weight measurement of the target object placed on the scale surface.

3. The method of claim 2, wherein the weight measurement obtaining step further includes:

receiving, by the processing circuitry, from the scale device, an indication that includes the weight measurement of the target object.

4. The method of claim 1, further comprising:

obtaining the image data representing the image captured by the optical sensor device, wherein the image includes the target object; and determining the object type or classification of the target object based on the image data.

5. The method of claim 1, further comprising:

determining that the object type or classification of the target object corresponds to the object type or classification of an object that requires a weight measurement to determine a price of that object; and determining that the process is to operate in the second processing mode.

6. The method of claim 5, further comprising:

determining the price of the target object based on the weight measurement of that object.

7. The method of claim 6, further comprising:

outputting, for display on a display device of the POS system, a visual representation associated with the target object, a price of that object, and the weight measurement of that object.

8. The method of claim 6, further comprising:

determining that the process is to operate in the first processing mode.

9. The method of claim 1, further comprising:

determining that the object type or classification of the target object is different from the object type or classification of an object that requires a weight measurement to determine a price of that object; and determining that the process is to operate in the first processing mode.

10. The method of claim 9, further comprising:

obtaining an expected weight of an object having the same object type or classification of the target object; and determining that the weight measurement of the target object corresponds to the expected weight of the object having the same object type or classification.

11. The method of claim 10, further comprising:

outputting, for display on a display device of the POS system, a visual representation associated with the target object and the price of that object.

12. The method of claim 9, further comprising:

obtaining an expected weight of an object having the same object type or classification of the target object; and determining that the weight measurement of the object is outside the expected weight of the object having the same object type or classification.

13. The method of claim 12, further comprising:

sending an indication associated with the weight measurement of the object being outside the expected weight of an object having the same object type or classification.

14. The method of claim 1, wherein the POS system further includes a terminal station apparatus having the processing circuitry and a bagging station apparatus having the scale device and the object type or classification of an object that requires a weight measurement to determine a price of that object is associated with produce.

15. A point of sale (POS) system, comprising:

a processing circuitry operationally coupled to an optical sensor device having a field of view about the POS system and operable to capture image data representing an image and to a scale device operationally coupled to the processing circuitry and operable to measure a weight of an object placed on a surface of the scale device; and wherein the POS system further includes a memory, the memory containing instructions executable by the processing circuitry whereby the processing circuitry is configured to:

capture, by the optical sensor device, the image data representing an image of a target object prior to any barcode scan of the target object;

analyze the captured image data to determine, based on one or more visual features of the target object and without reliance on barcode data, product lookup information or saleable item transaction data, an object type or classification of the target object; and in response to the determined object type or classification, select, prior to processing of a weight measurement of the target object, that a process enabled by the weight measurement of the target object operates in a first or second processing mode, wherein the first processing mode is associated with a security verification operation that includes determining that the weight measurement of the target object corresponds to an expected weight of an object having the same object type or classification of the target object, and the second processing mode is associated with a pricing operation that includes determining a price of the target object based on the weight measurement of the target object for an object type or classification that requires the weight measurement to determine the price of the target object.

16. The system of claim 15, wherein the memory includes further instructions executable by the processing circuitry whereby the processing circuitry is configured to:

determine that the object type or classification of the target object corresponds to the object type or classification of an object that requires a weight measurement to determine a price of that object; and determine that the process is to operate in the second processing mode.

17. The system of claim 15, wherein the memory includes further instructions executable by the processing circuitry whereby the processing circuitry is configured to:

determine that the object type or classification of the target object is different from the object type or classification of an object that requires a weight measurement to determine a price of that object; and determining that the process is to operate in the first processing mode.

18. The system of claim 17, wherein the memory includes further instructions executable by the processing circuitry whereby the processing circuitry is configured to:

obtain an expected weight of an object having the same object type or classification of the target object;

determine that the weight measurement of the target object corresponds to the expected weight of the object having the same object type or classification of the target object; and output, for display on a display device of the POS system, a visual representation associated with the target object and the price of that object.

19. The system of claim 17, wherein the memory includes further instructions executable by the processing circuitry whereby the processing circuitry is configured to:

obtain an expected weight of an object having the same object type or classification of the target object;

determine that the weight measurement of the target object is outside the expected weight of the object having the same object type or classification of the target object; and send an indication associated with the weight measurement of the target object being outside the expected weight of the object having the same object type or classification.

20. A point of sale (POS) system, comprising:

an optical sensor device having a field of view about the POS system and operable to capture image data representing an image;

a scale device operable to measure a weight of an object placed on a surface of the scale device;

a processing circuitry; and a memory containing instructions executable by the processing circuitry whereby the POS system is operative to:

capture, by the optical sensor device, the image data representing an image of a target object prior to any barcode scan of the target object;

analyze the captured image data to determine, based on one or more visual features of the target object and without reliance on barcode data, product lookup information or saleable item transaction data, an object type or classification of the target object; and in response to the determined object type or classification, select, prior to processing of a weight measurement of the target object, that a process enabled by the weight measurement of the target object operates in a first or second processing mode, wherein the first processing mode is associated with a security verification operation that includes determining that the weight measurement of the target object corresponds to an expected weight of an object having the same object type or classification of the target object, and the second processing mode is associated with a pricing operation that includes determining a price of the target object based on the weight measurement of the target object for an object type or classification that requires the weight measurement to determine the price of the target object.

\* \* \* \* \*